United States Patent
Asano et al.

(10) Patent No.: US 11,745,784 B2
(45) Date of Patent: Sep. 5, 2023

(54) HANDLE AND METHOD FOR MANUFACTURING THE SAME

(71) Applicant: NIHON PLAST CO., LTD., Fujinomiya (JP)

(72) Inventors: Iwao Asano, Shizuoka (JP); Takahiro Suwama, Shizuoka (JP)

(73) Assignee: NIHON PLAST CO., LTD., Fujinomiya (JP)

( * ) Notice: Subject to any disclaimer, the term of this patent is extended or adjusted under 35 U.S.C. 154(b) by 0 days.

(21) Appl. No.: 17/847,216

(22) Filed: Jun. 23, 2022

(65) Prior Publication Data

US 2023/0061692 A1 Mar. 2, 2023

(30) Foreign Application Priority Data

Aug. 24, 2021 (JP) .................................. 2021-136376

(51) Int. Cl.
*B62D 1/06* (2006.01)

(52) U.S. Cl.
CPC ..................... *B62D 1/06* (2013.01)

(58) Field of Classification Search
CPC . B62D 1/06; B62D 1/065; B62D 1/04; B62D 1/08; B62D 1/10; G05G 1/06; G05G 1/10
See application file for complete search history.

(56) References Cited

U.S. PATENT DOCUMENTS

| 1,538,854 | A | * | 5/1925 | Hull | .................... | B62D 1/06 |
| | | | | | | 116/31 |
| 3,802,291 | A | * | 4/1974 | Young, Jr. | ............... | B62D 1/06 |
| | | | | | | 74/552 |
| 9,352,768 | B2 | * | 5/2016 | Doursoux | ............... | B62D 1/06 |
| 2010/0050808 | A1 | * | 3/2010 | Min | .................. | B62D 1/065 |
| | | | | | | 74/552 |
| 2010/0199802 | A1 | * | 8/2010 | Guillaume | ............. | B62D 1/06 |
| | | | | | | 74/558 |
| 2011/0219910 | A1 | * | 9/2011 | Wu | .................. | B62D 1/06 |
| | | | | | | 74/558 |
| 2015/0353119 | A1 | * | 12/2015 | Ohira | ................. | B62D 1/065 |
| | | | | | | 219/204 |

(Continued)

FOREIGN PATENT DOCUMENTS

JP 2000-225951 8/2000

*Primary Examiner* — Richard W Ridley
*Assistant Examiner* — Brian J McGovern
(74) *Attorney, Agent, or Firm* — AMIN, TUROCY & WATSON, LLP

(57) ABSTRACT

A steering wheel 1 includes a rim section having a rim section main body section and a covering member that covers at least a part of the rim section main body section. The steering wheel 1 includes a decorative section attached to the rim section. The rim section main body section includes an attaching section to which the decorative section is attached in a direction intersecting a direction in which the rim section main body section extends. The covering member includes one split body and the other split body for covering one part and the other part of the rim section main body section with the attaching section as a reference. The one split body and the other split body are configured such that at least parts of end portions and facing each other in the attaching section have shapes complementary to each other.

3 Claims, 7 Drawing Sheets

(56) References Cited

U.S. PATENT DOCUMENTS

| | | | |
|---|---|---|---|
| 2016/0090116 A1* | 3/2016 | Joh | B62D 1/06 |
| | | | 74/558 |
| 2017/0094214 A1* | 3/2017 | Nagasawa | B62D 1/06 |
| 2017/0129527 A1* | 5/2017 | Del Rio Garcia | |
| | | | B29C 45/14819 |
| 2018/0348392 A1* | 12/2018 | Nishio | B62D 1/046 |

* cited by examiner

HANDLE AND METHOD FOR MANUFACTURING THE SAME

CROSS REFERENCE TO RELATED APPLICATION

This application is entitled to the benefit of Japanese Patent Application No. 2021-136376, filed on Aug. 24, 2021, the disclosure of which including the specification, drawings and abstract is incorporated herein by reference in its entirety.

TECHNICAL FIELD

The present invention relates to a handle in which a decorative section is attached to a grip section.

BACKGROUND ART

As a rim section which is a grip section of a steering wheel which is a handle of an automobile, there is one of which appearance is improved by covering the surface with a covering member such as real leather. When covering the rim section main body section with the covering member, a substantially center portion along the longitudinal direction of the covering members joined in a ring shape is attached to the outermost circumferential side of the rim section main body, and then both end edges along the longitudinal direction of the covering member are attracted toward the inner circumferential side of the rim section main body section while being pulled, and in many cases, a step of sewing with both end edges in face-to-face contact is used.

Conventionally, a steering wheel in which a wood grain decorative section is provided at a part of a rim section is known (for example, refer to PTL 1). In the case of this configuration, even when the rim section main body section is covered with the covering member, the attaching section to which the decorative section is attached needs to be exposed on the surface. In this case, by covering the rim section main body section in a state where the covering member of the part corresponding to the attaching section is cut out in advance by hollowing out the covering member into a shape surrounding the attaching section, it is possible to perform the covering work in the above step.

On the other hand, in recent years, the required design of decorative section has been also diversified. For example, a pair of semi-circular decorative sections along the outer circumferential diameter of the rim section in the lateral direction are fitted to a part of the rim section to achieve a decorative section that serves as a center mark over the entire circumference of the rim section in the lateral direction. In this case, in order to expose the attaching section to which the decorative section is attached to the surface of the rim section, it is necessary to completely divide a part of the covering member.

Since the covering member divided in this manner is not continuous in a ring shape, the work must be performed while pulling the covering member toward the divided end portion when wrapping the covering member around the rim section main body section, the work is difficult, and sufficient pulling is not possible. In this case, there is a concern of being affected in terms of manufacturing and quality, such as wrinkles that cause appearance defects.

CITATION LIST

Patent Literature

PTL 1 Japanese Patent Application Laid-Open No. 2000-225951 (pages 3 to 4, FIGS. 1 to 3)

SUMMARY OF INVENTION

Technical Problem

As described above, a configuration capable of preventing appearance defects while ensuring workability for attaching the covering member is desired.

The present invention has been made in view of such a point, and an object thereof is to provide a handle having good workability for attaching a covering member to a grip section main body section and having an excellent appearance.

Solution to Problem

According to claim 1, there is provided a handle including: a grip section having a grip section main body section and a covering member that covers at least a part of the grip section main body section; and a decorative section attached to the grip section, in which the grip section main body section includes an attaching section to which the decorative section is attached in a direction intersecting a direction in which the grip section main body section extends, the covering member includes one split body and the other split body for covering one part and the other part of the grip section main body section with the attaching section as a reference, and the one split body and the other split body are configured such that at least parts of end portions facing each other in the attaching section have shapes complementary to each other.

In the handle according to claim 2, according to the handle described in claim 1, the one split body and the other split body may be configured such that complementary shapes of the end portions facing each other are intermittently formed.

Advantageous Effects of Invention

According to the handle described in claim 1, it is possible to attach the covering member which has not been divided in advance to the grip section main body section and then cut the covering member at the position of the attaching section. Therefore, it is possible to provide a handle having good workability of attaching the covering member to the grip section main body section, less likely to have an appearance defect such as wrinkles in the covering member, and having an excellent appearance.

According to the handle described in claim 2, in addition to the effect of the handle according to claim 1, it is possible to pre-form the covering member to have hole sections intermittently and cut the covering member from the hole sections. Therefore, when covering at least a part of the grip section main body section with the covering member, the attaching section can be visually recognized through the hole section, and thus the covering member can be easily aligned with the attaching section, the covering member can be easily cut from the hole section, and workability is improved.

DESCRIPTION OF EMBODIMENTS

Hereinafter, a first embodiment of the present invention will be described with reference to the drawings.

Figure 5:
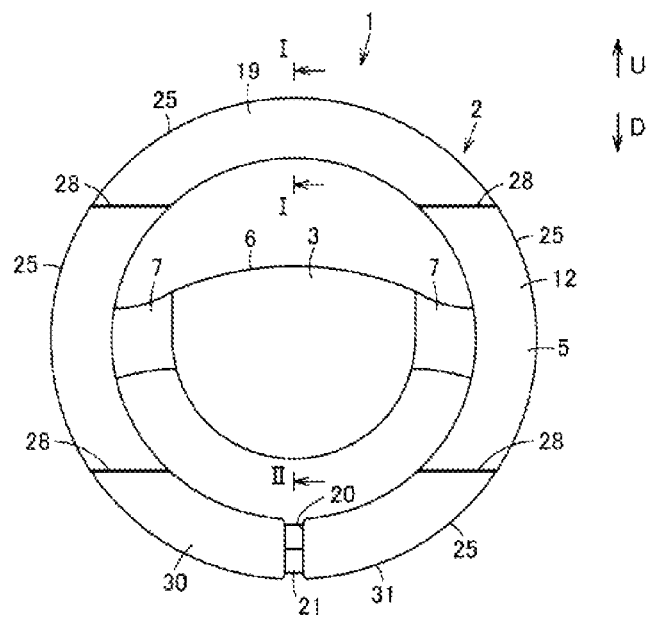
FIG. 5 is a front view of the handle described above.

In FIG. 5, reference numeral 1 denotes a steering wheel which is, for example, a handle (steering handle) of an automobile as a vehicle. The steering wheel 1 includes a steering wheel main body 2 which is a handle main body, a module 3 mounted on the occupant side of the steering wheel main body 2, and the like. The steering wheel 1 is normally mounted on a steering shaft provided in a vehicle in an inclined state. However, hereinafter, when the steering wheel 1 is viewed from the driver (occupant) side, in the description, the arrow U direction indicates an upward direction, the arrow D direction indicates a downward direction, the front side of the vehicle, that is, the windshield side above the front side indicates the front side or the back surface side, and the rear side of the vehicle, that is, the side below the rear side indicates the rear side, the near side, or the front surface side. Further, the arrangement of each section of the steering wheel main body 2 such as up, down, left, and right is based on the neutral position of the steering wheel 1.

The steering wheel main body 2 includes a rim section (grip section) 5 as a grip section, a boss section 6 positioned inside the rim section 5, and a plurality of spoke sections 7 connecting the rim section 5 and the boss section 6.

The rim section 5 is a part that is gripped and operated by the driver (occupant). At least a part of the rim section 5 is formed in an arc shape. That is, in the present embodiment, the rim section 5 extends in the circumferential direction. Preferably, the rim section 5 is formed in a circular shape. In the present embodiment, the rim section 5 is formed in an annular shape.

The boss section 6 is a part coupled to the steering shaft. Further, the module 3 is attached to the occupant side of the boss section 6. Furthermore, the back surface side of the boss section 6 is covered with a cover body. The cover body is also called a back cover, a lower cover or a body cover, and is made of synthetic resin or the like.

In the present embodiment, two spoke sections 7 are formed on the left and right sides. Not limited to this, three, four, or more spoke sections 7 may be formed.

As the module 3, for example, an airbag device or a pad body accommodating a shock absorber can be used. A horn switch mechanism or the like as a switch device may be integrally incorporated in the module 3.

Next, the structure of the steering wheel main body 2 will be described.

Figure 4A:
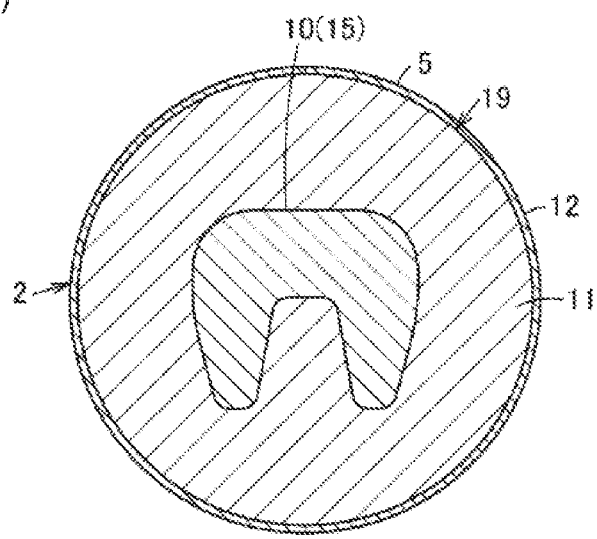
FIG. 4(a) is a cross-sectional view of a position corresponding to I-I in FIG. 5.
Figure 4B:
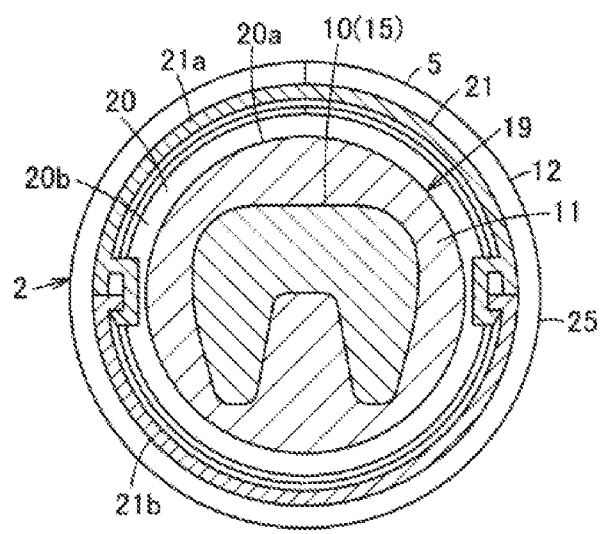
FIG. 4(b) is a cross-sectional view of a position corresponding to II-II in FIG. 5.

As shown in FIGS. 4(a), 4(b), and 5, the steering wheel main body 2 covers a core metal 10, a resin layer 11 which is a base material layer covering the core metal 10, and a covering member 12 that covers the resin layer 11.

The core metal 10 is made of metal such as aluminum or magnesium. The core metal 10 has at least a rim core metal section 15 which is a grip section core metal section forming a part of the rim section 5, and a boss core metal section which forms a part of the boss section 6. Further, the core metal 10 may have a spoke core metal section forming a part of the spoke section 7.

The rim core metal section 15 is formed in a shape corresponding to the shape of the rim section 5. That is, the rim core metal section 15 has a circular shape, for example, at least a part of which is formed along an arc according to the shape of the rim section 5. In the present embodiment, the rim core metal section 15 is formed in an annular shape.

The boss core metal section is configured by integrally fixing the boss plate constituting the core body to the boss having a serration structure that meshes with the steering shaft.

The spoke core metal section is formed to extend radially from the boss plate of the boss core metal section. The spoke core metal section does not necessarily correspond to all of the spoke sections 7, and at least a part of the spoke sections 7 may be composed of a finisher, a cover body, or the like without the spoke core metal section.

The resin layer 11 is formed to cover at least the rim core metal section 15. Therefore, at least a part of the resin layer 11 is formed in an arc shape, and in the present embodiment, the resin layer 11 is formed in a circular shape or an annular shape. The resin layer 11 is formed, for example, in a round cross section (including a substantially round cross section). As the resin layer 11, for example, a soft foamed polyurethane resin, which is finely foamed, is used. The rim core metal section 15 and the resin layer 11 that covers the rim core metal section 15 constitute a rim section main body section 19 as a grip section main body section. The rim section main body section 19 is formed in a round shape or a substantially circular shape as a whole. That is, at least a part of the rim section main body section 19 has an arc shape. The rim section main body section 19 is positioned to extend in the rotation direction of the steering wheel 1, that is, in the circumferential direction of the steering shaft.

An attaching section 20 is formed on the resin layer 11, that is, the surface of the rim section main body section 19. The attaching section 20 has a groove shape, and is a part in which a part of the covering member 12 is accommodated and a decorative section 21 is attached by covering a part of the covering member 12. The attaching section 20 is formed on the resin layer 11 along the direction in which the rim section main body section 19 extends, that is, the longitudinal direction of the rim section main body section 19, and in the present embodiment, the direction intersecting the circumferential direction of the rim section main body section 19. The attaching section 20 is formed on the resin layer 11 along the meridian direction of the rim section main body section 19. That is, the attaching section 20 is formed in the small diameter direction of the rim section main body section 19. In the present embodiment, the attaching section 20 is positioned at the 6 o'clock direction of the analog clock, that is, the lower part in the rim section main body section 19 when the steering wheel main body 2 is viewed from the front. The attaching section 20 may be continuous over the entire circumference in the meridian direction of the rim section main body section 19, or may be intermittent. The attaching section 20 may be formed at the same time, for example, when the resin layer 11 is molded, or may be processed and formed after the resin layer 11 is molded. The attaching section 20 is formed by raising side walls 20b from both side portions of a bottom portion 20a. The bottom portion 20a is formed at a position at a predetermined depth from the surface of the resin layer 11 of the rim section main body section 19. In the present embodiment, the bottom portion 20a is formed parallel to (including substantially parallel to) the surface of the resin layer 11 of the rim section main body section 19. In the illustrated example, the bottom portion 20a is formed to be continuous in the meridian direction of the resin layer 11 of the rim section main body section 19.

The decorative section 21 is a decorating section exposed on the surface of the steering wheel 1. The decorative section 21 of the present embodiment is arranged to extend radially in the 6 o'clock direction of the analog clock in the rim section main body section 19 when the steering wheel main body 2 is viewed from the front, and has a function as a center mark of the rim section 5. The decorative section 21 is formed in a strip shape having a constant width or a substantially constant width. Further, the decorative section 21 is formed in an annular shape to be fitted to the attaching section 20. That is, the decorative section 21 has an annular shape in the meridian direction of the rim section main body section 19. The decorative section 21 is arranged in the attaching section 20 as the decorative section 21 is divided into a plurality of, for example, a pair of decorative bodies 21a and 21b in the meridian direction of the rim section main body section 19, and the decorative bodies 21a and 21b are arranged to sandwich the resin layer 11 in the attaching section 20 to be locked to each other by claw fitting. The decorative section 21 is made of any material such as synthetic resin, metal, or wood.

The decorative section 21 covers a part of the covering member 12 in the attaching section 20. The covering member 12 is a part directly gripped by the driver (occupant) and is a decorating section exposed on the surface of the steering wheel 1. The covering member 12 is formed in a sheet shape, for example, from leather such as natural leather or synthetic leather, or synthetic resin. In the present embodiment, the covering member 12 is arranged to continuously cover the entire surface of the resin layer 11 of the rim section main body section 19. In the present embodiment, the covering member 12 is composed of a plurality of covering member pieces 25, and the end edge portions of the covering member pieces 25 are integrally formed by being coupled by sewing or the like.

Figure 2A:
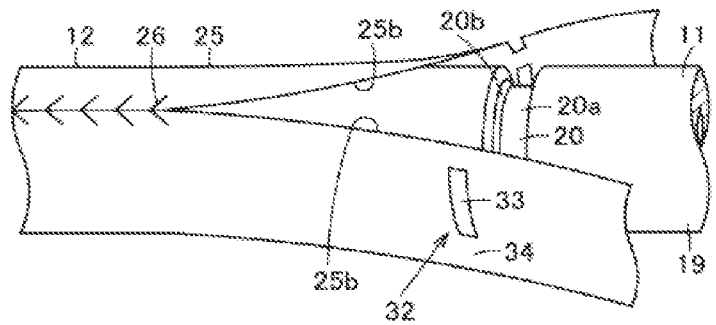
FIG. 2(a) is a perspective view showing a step of wrapping a covering member around a grip section main body section of the same handle as above.
Figure 3:
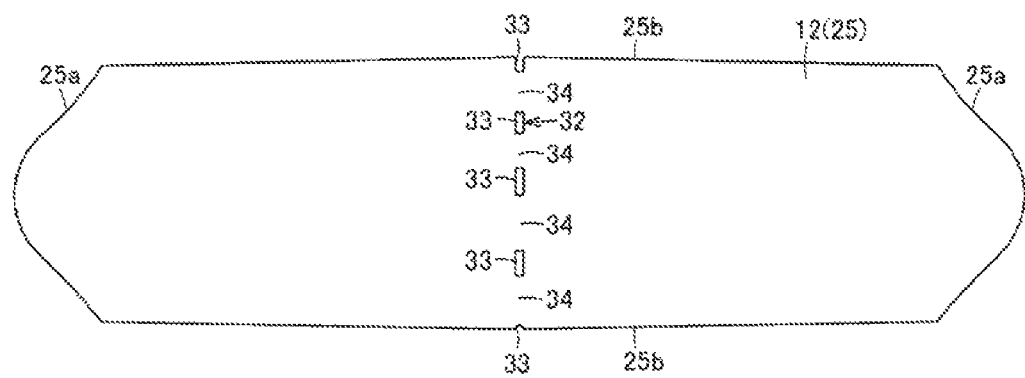
FIG. 3 is a plan view showing a part of an example of the covering member of the handle described above.

As shown in FIG. 3, the covering member piece 25 is formed in a longitudinal direction, and is formed such that the center portion in the lateral direction projects in the longitudinal direction from the end edge portions 25b and 25b along the longitudinal direction, in the side edge portions 25a and 25a along the lateral direction. The center portion of the covering member piece 25 in the lateral direction is arranged on the outer circumferential side of the rim section main body section 19 (FIG. 5) when the rim section main body section 19 (FIG. 5) is viewed from the front, and the end edge portions 25b and 25b along the longitudinal direction are joined to each other on the inner circumferential side of the rim section main body section 19 (FIG. 5) at a joint section 26 (FIG. 2(a)), such as a sewn part, such that the covering member 12 is attached covering the rim section main body section 19.

Furthermore, in the present embodiment, as shown in FIG. 5, the covering member 12 is dropped into a predetermined part, for example, the position of a groove section in which a connecting section between the covering member pieces 25 is formed in the rim section main body section 19, and a design section 28 that constitutes a so-called wood grain-like design is configured on the driver (occupant) side of the rim section 5. For example, the design section 28 (groove section) is arranged in the rim section main body section 19 in the 2 o'clock, 4 o'clock, 8 o'clock, and 10 o'clock directions of the analog clock when the steering wheel main body 2 is viewed from the front, and is formed in a linear shape inclined in the radial direction.

Further, the covering member 12 (covering member piece 25) is formed in a ring shape or a longitudinal shape in advance, and is divided at the position of the decorative section 21 or the attaching section 20 at the time of manufacturing. That is, the covering member 12 includes one split body 30 and the other split body 31 at one part and the other part with the decorative section 21 or the attaching section 20 as a reference. In the present embodiment, the covering member piece 25 positioned at the lower part is divided into one split body 30 and the other split body 31.

The one split body 30 and the other split body 31 are formed by being divided from the planned split section 32 shown in FIG. 3. The planned split section 32 is pre-formed in a linear shape or the like in a direction intersecting the longitudinal direction of the covering member 12 (covering member piece 25). Therefore, the planned split section 32 is arranged along the meridian direction of the rim section main body section 19 (FIG. 5) in a state where the rim section main body section 19 (FIG. 5) is covered with the covering member 12.

The planned split section 32 may be formed in any manner, but as an example, can be formed as a hole section 33 intermittently formed in the covering member 12 and a continuous section 34 between the hole sections 33 and 33.

The hole section 33 is preferably set to have a width of 2 mm, a length of 10 mm±5 mm, more preferably 11 mm, or the like. The pitch of the continuous section 34 between the hole sections 33 and 33 is preferably equal to or longer than the length of the hole section 33. When the size of the hole section 33 is extremely small, it becomes difficult to see the rim section main body section 19 (FIG. 5) from the hole section 33, and when the hole section 33 is extremely large, the hole section 33 is open when the covering member 12 covers at least a part of the rim section main body section 19 (FIG. 5), a so-called opening occurs. Thus, it becomes difficult to align the covering member 12 with respect to the rim section main body section 19 (FIG. 5).

Figure 1:
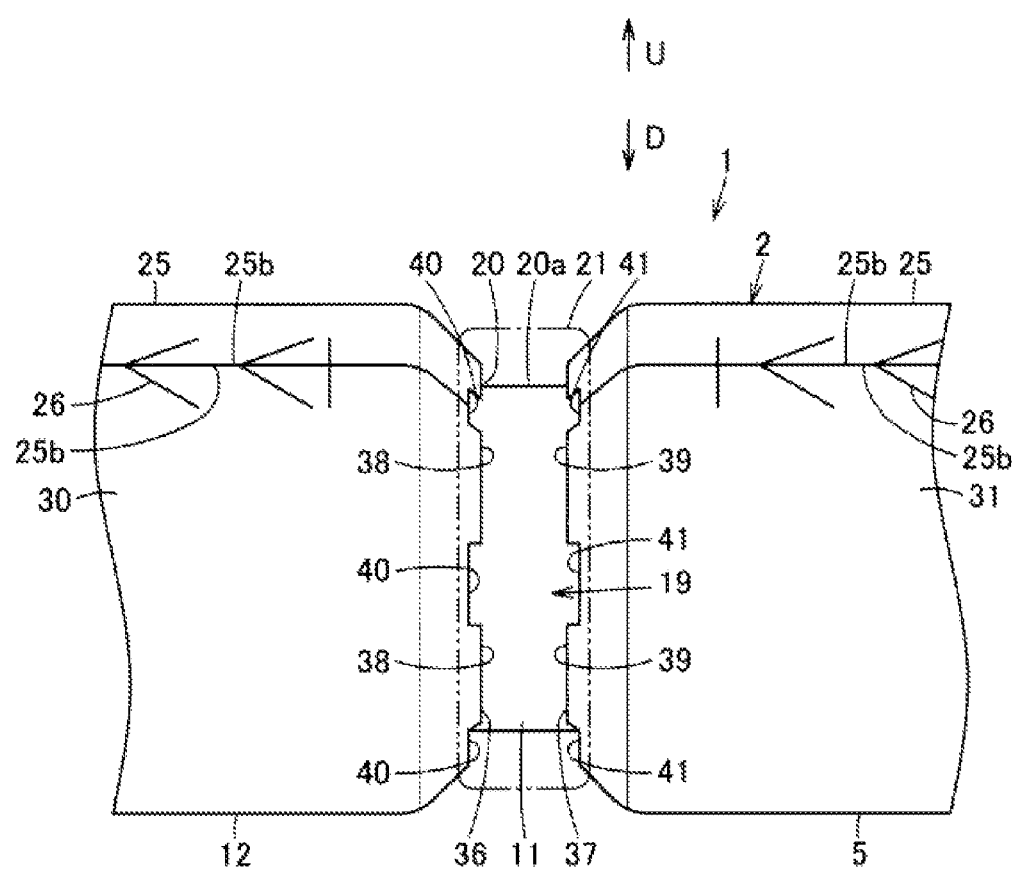
FIG. 1 is an enlarged front view showing a part of a handle according to a first embodiment of the present invention.

In each of the one split body 30 and the other split body 31 of the covering member 12 divided from the planned split section 32, the end portions 36 and 37 shown in FIG. 1 are inserted into the attaching section 20 and positioned facing each other in the longitudinal direction in which the rim section main body section 19 extends, and are covered and hidden by the decorative section 21 attached to the attaching section 20. The end portion 36 is one edge portion of the planned split section 32 (FIG. 3), and the end portion 37 is the other edge portion of the planned split section 32 (FIG. 3). Therefore, at least at a part of the end portions 36 and 37, cut sections 38 and 39 in which the continuous section 34 (FIG. 3) is cut are positioned. In the present embodiment, the cut sections 38 and 39 are positioned between the non-cut sections 40 and 40 and the non-cut sections 41 and 41, which are the side edge portions of the hole section 33 (FIG. 3), and are intermittent. The cut sections 38 and 39 have shapes complementary to each other. That is, the cut sections 38 and 39 have a linear shape parallel to or substantially parallel to each other, or a curved line having the same magnitude of curvature (radius of curvature) and opposite signs to each other. In the present embodiment, the cut sections 38 and 39 coincide with each other such that the end portions 36 and 37 are arranged side by side and connected to each other. Further, in the present embodiment, the end portion 36 has a rectangular wavy shape in which the cut section 38 and the non-cut section 40 are alternately arranged in the longitudinal direction. Similarly, the end portion 37 has a rectangular wavy shape in which the cut section 39 and the non-cut section 41 are alternately arranged in the longitudinal direction.

Then, when manufacturing the steering wheel 1, first, the pre-formed core metal 10 is set in the molding die, and then the synthetic resin raw material is stirred and mixed into the cavity and injected. As a result, the synthetic resin raw material reacts with foaming to become polyurethane and flows toward the flowing end.

Next, the intermediate formed by the resin layer 11 covering the rim core metal section 15 in the cavity is removed from the molding die, and burrs and the like are cut.

After that, the surface of the resin layer 11 of the intermediate is covered with the covering member 12. For example, the covering member 12 is formed in a longitudinal shape by coupling the side edge portions 25a of the plurality of covering member pieces 25 to each other in advance by sewing or the like, and the covering member 12 is attached to be wrapped around the resin layer 11 from the outer circumferential side to the inner circumferential side. At this time, as shown in FIG. 2(a), the planned split section 32 is aligned with the position of the attaching section 20 formed on the resin layer 11, the end edge portions 25b and 25b of the covering member piece 25 are joined to each other by the joint section 26 such as sewing except for the planned split section 32 at the position on the inner circumferential side of the resin layer 11, and accordingly, the covering member 12 is fixed to the rim section main body section 19. In this work, when the hole section 33 is formed in the planned split section 32, the operator can visually recognize the attaching section 20 through the hole section 33, such that the planned split section 32 can be easily aligned with the attaching section 20.

Further, the connecting section of the covering member pieces 25 is dropped into the groove section formed on the resin layer 11, and both end portions of the covering member 12 are joined to each other at the position corresponding to one groove section by sewing or the like and dropped into the groove section to be fixed as the design section 28 (FIG. 5).

Figure 2B:
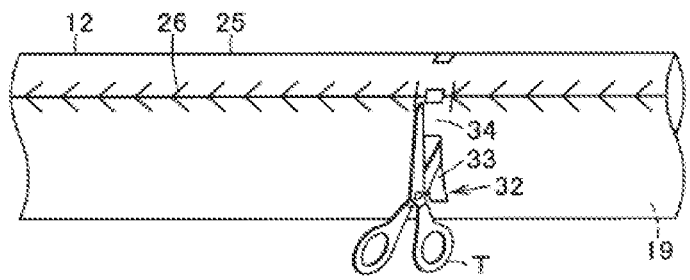
FIG. 2(b) is a perspective view showing a step of cutting the covering member from a planned split section following (a)
Figure 2C:
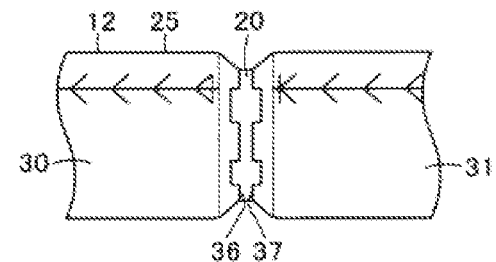
FIG. 2(c) is a front view showing a position of the covering member cut by (b) in the attaching section.

When the coating of the resin layer 11 by the covering member 12 is completed, the covering member 12 is split from the planned split section 32 as shown in FIG. 2(b). For example, the planned split section 32 cuts the continuous section 34 over the entire circumference of the rim section main body section 19 in the meridian direction by using a tool T such as scissors or a cutter. At this time, the planned split section 32 may be cut in one direction by the tool T, or the half circumference of the rim section main body section 19 in the meridian direction is cut in one direction, and the remaining half circumference is cut in the opposite direction. By splitting the covering member 12 from the planned split section 32, as shown in FIG. 2(c), the end portion 36 of one split body 30 and the end portion 37 of the other split body 31 are positioned at a part and the other part with the attaching section 20 as a reference, and face each other in the longitudinal direction.

Figure 2D:
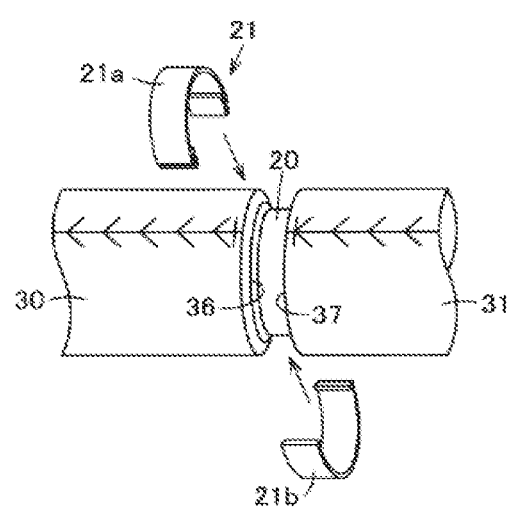
FIG. 2(d) is a perspective view showing a step of attaching the decorative section to the attaching section following (b)

In this state, as shown in FIGS. 1 and 2(d), the decorative section 21 is attached to the attaching section 20 while covering the end portion 36 of one split body 30 and the end portion 37 of the other split body 31.

Then, in the completed steering wheel main body 2, the module 3, the cover body, and the like are attached to the steering wheel main body 2, and the steering wheel 1 is completed.

As described above, in the first embodiment, the planned split section 32 is pre-formed on the covering member 12, and at least a part of the rim section main body section 19 is covered with the covering member 12 such that the planned split section 32 is aligned with the attaching section 20, the covering member 12 is cut from the planned split section 32, and then, the decorative section 21 is attached to the attaching section 20. Therefore, the covering member 12 is divided into one split body 30 and the other split body 31 that cover one and the other of the rim section main body section 19 with the attaching section 20 as a reference, and at least a part of the end portions 36 and 37 facing each other in the attaching section 20 of one split body 30 and the other split body 31 has a shape complementary to each other. That is, it is possible to attach the covering member 12 which has not been divided in advance to the rim section main body section 19 and then cut the covering member 12 at the position of the attaching section 20. Therefore, it is possible to provide the steering wheel 1 having good workability of attaching the covering member 12 to the rim section main body section 19, less likely to have an appearance defect such as wrinkles in the covering member 12, and having an excellent appearance.

Further, in the present embodiment, the planned split section 32 is pre-formed on the covering member 12 to have the hole section 33 intermittently, and the covering member 12 is cut from the hole section 33. Therefore, a complementary shape, that is, the cut sections 38 and 39 are formed intermittently at the end portions 36 and 37 of the one split body 30 and the other split body 31 facing each other after the covering member 12 is cut from the planned split section 32. In this case, when the covering member 12 covers at least a part of the rim section main body section 19, the attaching section 20 can be visually recognized through the hole section 33, and thus the planned split section 32 of the covering member 12 can be easily aligned with the attaching section 20, the covering member 12 can be easily cut from the hole section 33 at the planned split section 32, and the workability is improved.

In the first embodiment, the hole section 33 may have a slit shape or the like so as not to form a gap.

Figure 6:
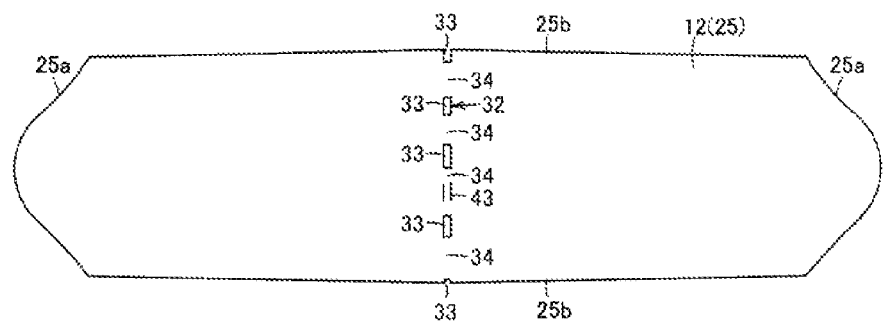
FIG. 6 is a plan view showing a part of another example of the covering member according to a second embodiment of the present invention.

Further, as in the second embodiment shown in FIG. 6, between the hole sections 33 and 33, a split assisting section 43 for assisting the cutting from the planned split section 32 is formed at least any one of the continuous sections 34 at a position separated from the hole section 33. In particular, the split assisting section 43 is preferably formed at a place where the pitch between the hole sections 33 and 33 is larger than a predetermined value. The split assisting section 43 is formed as, for example, a slit or a thin-walled portion. In this case, the covering member 12 can be easily cut from the planned split section 32, the cutting distance is shortened in the planned split section 32, and the cutting accuracy can be improved.

Figure 7:
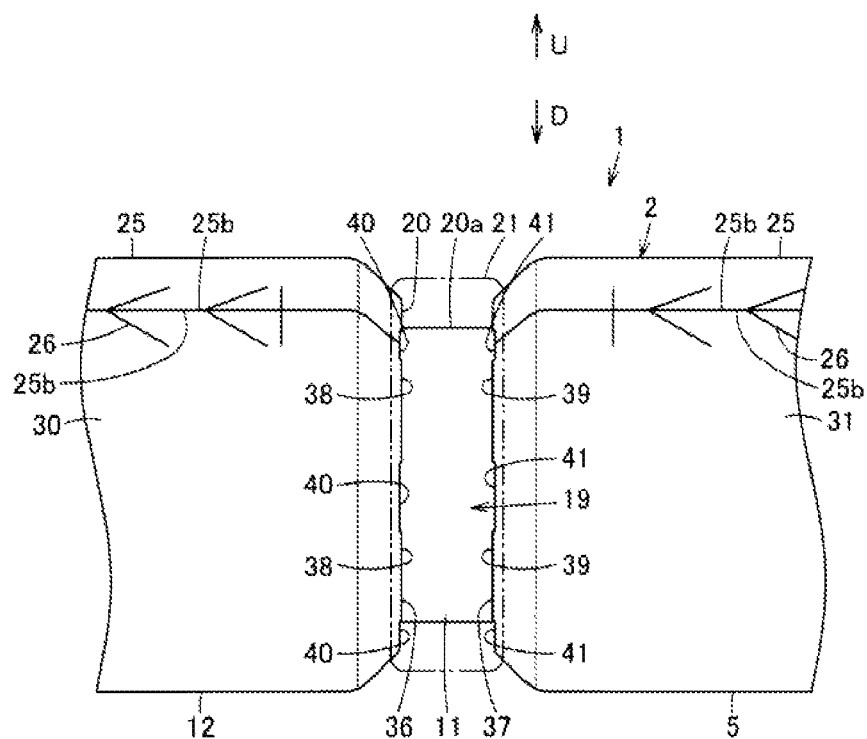
FIG. 7 is a front view showing a position of a cut covering member of a handle according to a third embodiment of the present invention at an attaching section.
Figure 8:
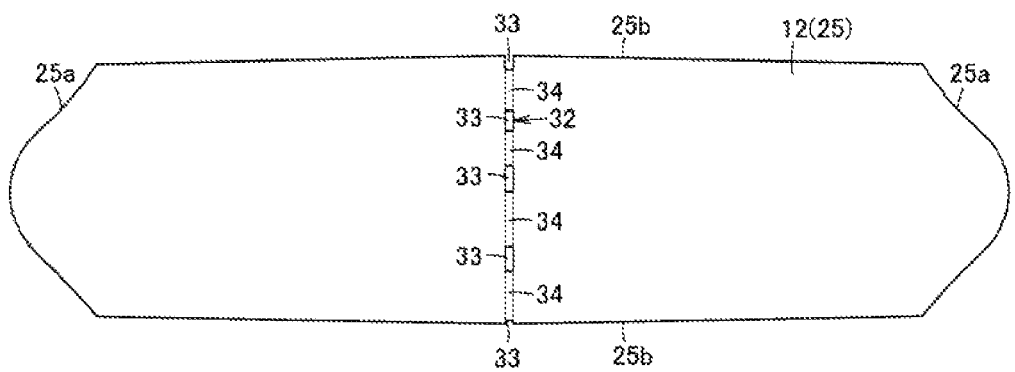
FIG. 8 is a plan view showing a part of another example of the covering member of the handle described above.

The tool for splitting the covering member 12 from the planned split section 32 may be a tool for partially removing the planned split section 32. For example, as in the third embodiment shown in FIGS. 7 and 8, the planned split section 32 may be removed in a strip shape by a tool. In this case, the cut sections 38 and 39 of the end portions 36 and 37 do not coincide with each other to be continuous with each other, but have a complementary shape to each other. Further, in the illustrated example, the non-cut sections 40 and 41 slightly remain on the end portions 36 and 37, and the end portions 36 and 37 have a rectangular wavy shape, but not being limited thereto, the cut section 38 and the non-cut section 40 and the cut section 39 and the non-cut section 41 may be connected to each other in a plane. Even in this case, the same effect as that of the first embodiment can be obtained.

Figure 9:
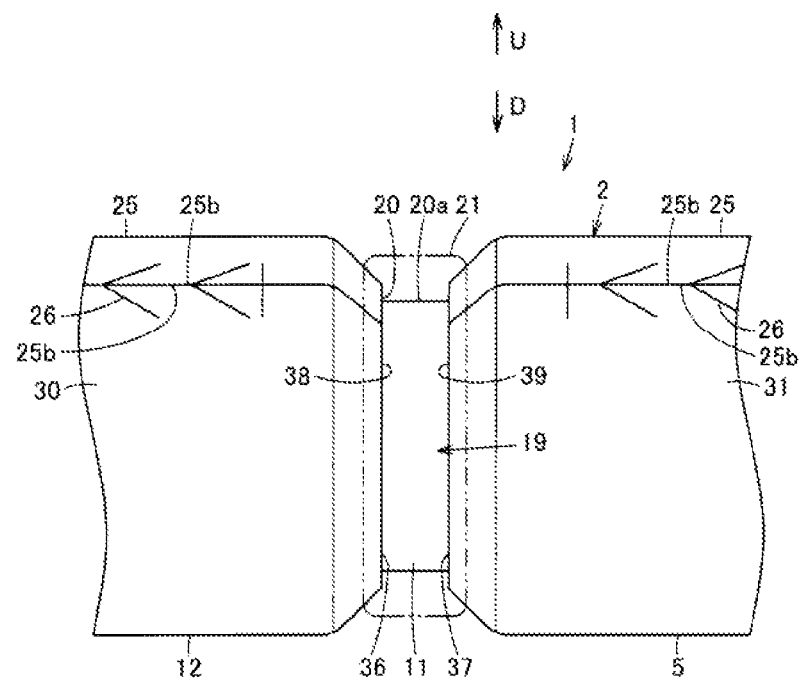
FIG. 9 is a front view showing a position of a cut covering member of a handle according to a fourth embodiment of the present invention at an attaching section.
Figure 10:
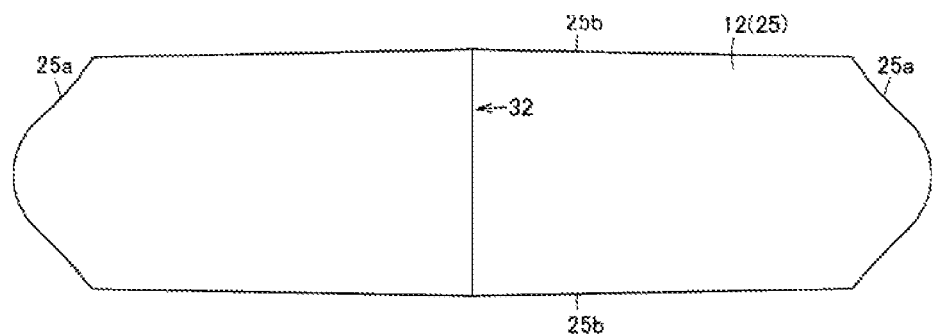
FIG. 10 is a plan view showing a part of still another example of the covering member of the handle described above.

Further, as in the fourth embodiment shown in FIGS. 9 and 10, even when the planned split section 32 is formed as a mark line, the same effect can be obtained. The mark line may be printed on the surface of the covering member 12 (covering member piece 25), or may be formed thinner than the other parts of the covering member 12 (covering member piece 25). In this case, the end portion 36 of one of the split bodies 30 and the end portion 37 of the other split body 31 split from the planned split section 32 form a continuous cut section as a whole and have a shape complementary to each other.

Furthermore, in each of the above embodiments, when the attaching section 20 is formed in a direction intersecting the extending direction of the rim section main body section 19 and cuts the covering member 12, depending on the design of the steering wheel 1 and the like, any position and any number of the attaching sections 20 may be set.

Further, the rim section 5 may be the whole or a part of the annulus, or at least a part thereof may be linear.

The steering wheel 1 can be used as a handle for steering any transportation as well as a vehicle such as an automobile.

INDUSTRIAL APPLICABILITY

The present invention can be suitably used as a steering wheel of an automobile such as an electric car.

REFERENCE SIGNS LIST

1 Steering wheel which is handle
5 Rim section as grip section
12 Covering member
19 Rim section main body section as grip section main body section
20 Attaching section
21 Decorative section
30 One split body
31 Other split body
32 Planned split section
33 Hole section
36, 37 End portion

What is claimed is:

1. A steering wheel comprising:
a hub;
a grip section formed annularly about the hub along a circumferential axis of the hub, the grip section having a grip section main body section and a covering member that covers at least a part of the grip section main body section; and
wherein the part of the grip section main body section has a local cross-section having an axial axis formed parallel to the circumferential axis of the hub and a circumferential axis formed about the axial axis;
a decorative section,
wherein the part of the grip section main body section includes an attaching section to which the decorative section is attached, the decorative section extending along the circumferential axis of the part of the grip section main body section around the attaching section,
the covering member includes one split body and an other split body for at least partially covering the part of the grip section main body section, and
each of the one split body and the other split body has a distal end facing along the axial axis of the part of the grip section main body section, each distal end including a plurality of protrusions and recesses formed alternately about the circumferential axis of the part of the grip section main body section.

2. The steering wheel according to claim 1, wherein the decorative section is formed at a bottom of the grip section and serves as a center mark for a neutral position of the steering wheel.

3. The steering wheel according to claim 1, wherein the pluralities of protrusions and recesses are formed by cutting the covering member.

* * * * *